United States Patent
Singla et al.

(10) Patent No.: US 10,303,221 B2
(45) Date of Patent: May 28, 2019

(54) MAGNET BIASING MECHANISM

(71) Applicant: Microsoft Technology Licensing, LLC, Redmond, WA (US)

(72) Inventors: Aseem Singla, Redmond, WA (US); Eugene Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/592,508

(22) Filed: May 11, 2017

(65) Prior Publication Data

US 2018/0329459 A1    Nov. 15, 2018

(51) Int. Cl.
    *G06F 1/16*    (2006.01)
(52) U.S. Cl.
    CPC ............ *G06F 1/1669* (2013.01); *G06F 1/169* (2013.01); *G06F 1/1679* (2013.01)
(58) Field of Classification Search
    CPC ..................................................... G06F 1/1679
    See application file for complete search history.

(56) References Cited

U.S. PATENT DOCUMENTS

| | | | | |
|---|---|---|---|---|
| 6,068,307 A * | 5/2000 | Murphy | ................ | G06F 1/1616 292/300 |
| 8,570,736 B2 | 10/2013 | McClure et al. | | |
| 8,776,358 B2 | 7/2014 | Gotham et al. | | |
| 9,010,972 B2 | 4/2015 | Jung | | |
| 9,071,672 B2 | 6/2015 | Smith et al. | | |
| 9,075,566 B2 * | 7/2015 | Whitt, III | ................ | G06F 1/16 |
| 9,158,384 B2 * | 10/2015 | Whitt, III | .............. | G06F 1/1618 |
| 9,170,444 B2 | 10/2015 | Dai | | |
| 9,213,373 B2 | 12/2015 | Lin | | |
| 9,307,657 B2 | 4/2016 | Gotham et al. | | |
| 9,374,927 B2 | 6/2016 | Byeon et al. | | |
| 2005/0083644 A1 * | 4/2005 | Song | ....................... | G06F 1/162 361/679.06 |
| 2005/0167992 A1 * | 8/2005 | Lo | ........................... | E05C 19/16 292/251.5 |
| 2005/0236848 A1 * | 10/2005 | Kim | ....................... | E05C 19/16 292/251.5 |
| 2006/0006674 A1 * | 1/2006 | Kang | ..................... | E05C 19/16 292/251.5 |
| 2007/0121303 A1 * | 5/2007 | Wang | .................. | H04M 1/0222 361/752 |
| 2009/0027583 A1 | 1/2009 | Mcbroom et al. | | |
| 2009/0103261 A1 * | 4/2009 | Shih | ....................... | E05C 19/16 361/679.58 |

(Continued)

OTHER PUBLICATIONS

Jentsch, Sebastian, "Dell Inspiron 13 5368 Convertible Review", http://www.notebookcheck.net/Dell-Inspiron-13-5368-Convertible-Review.172421.0.html, Published on: Mar. 9, 2016, 15 pages.

*Primary Examiner* — Adrian S Wilson
(74) *Attorney, Agent, or Firm* — Holzer Patel Drennan

(57) ABSTRACT

An input component of a computing device disclosed herein includes a magnet located along an internal chassis of the input component, a biasing mechanism located between the magnet and a ledge of the internal chassis, and a fastening mechanism configured to attach the biasing mechanism to the ledge of the internal chassis such that the magnet is removably or non-permanently attached to the internal chassis. In one implementation, the magnet is glued to the biasing mechanism.

17 Claims, 11 Drawing Sheets

(56) References Cited

U.S. PATENT DOCUMENTS

| | | | |
|---|---|---|---|
| 2010/0176698 A1* | 7/2010 | Wu | G06F 1/1616 |
| | | | 312/223.1 |
| 2013/0107431 A1* | 5/2013 | Xu | G06F 1/1616 |
| | | | 361/679.01 |
| 2014/0085796 A1 | 3/2014 | Mathew et al. | |
| 2014/0118911 A1 | 5/2014 | Tang et al. | |
| 2014/0160654 A1* | 6/2014 | Yoo | G06F 1/1637 |
| | | | 361/679.12 |
| 2014/0192470 A1 | 7/2014 | Ho et al. | |
| 2016/0091748 A1 | 3/2016 | Kuk et al. | |

* cited by examiner

MAGNET BIASING MECHANISM

BACKGROUND

Computing devices include a large number of components that are mounted on the chassis of the computing device using various means. For example, some components may be mounted using mechanically using some type of mechanical fastening mechanism, while some other components may be glued to (or on) some part of the chassis. How the components are mounted on the chassis adds constraints to the process of assembling of computing devices as well as it affects the performance and durability of the computing device.

SUMMARY

An input component of a computing device disclosed herein includes a magnet located along an internal chassis of the input component, a biasing mechanism located between the magnet and a ledge of the internal chassis, and a fastening mechanism configured to attach the biasing mechanism to the ledge of the internal chassis such that the magnet is removably or non-permanently attached to the internal chassis. In one implementation, the magnet is glued to the biasing mechanism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Example implementations are illustrated in referenced figures of the drawings. It is intended that the implementations and figures disclosed herein are to be considered illustrative rather than restrictive.

Figure 7:
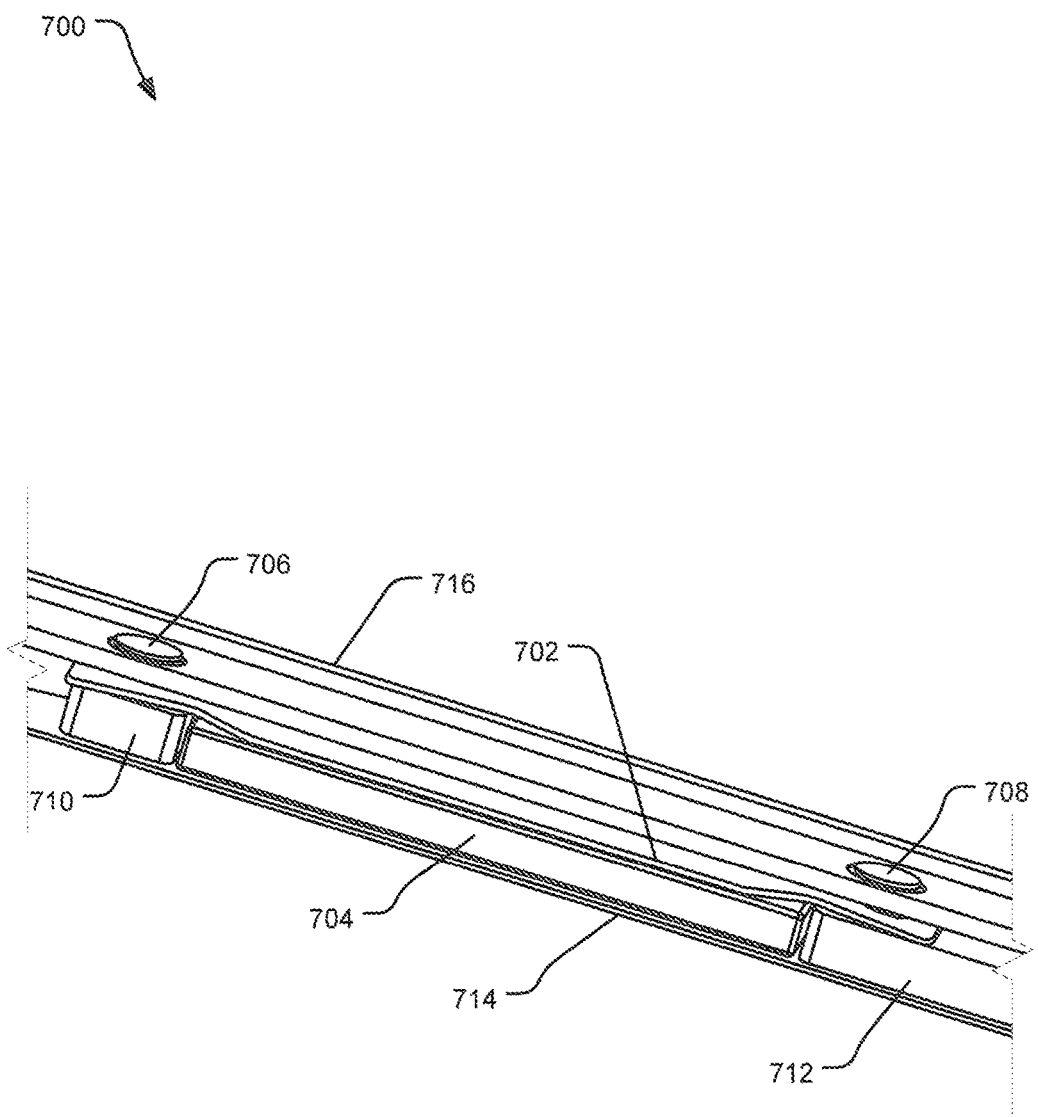

FIG. 7 an example implementation of a magnet biasing bracket assembly disclosed herein installed in a computing device.

Figure 8:
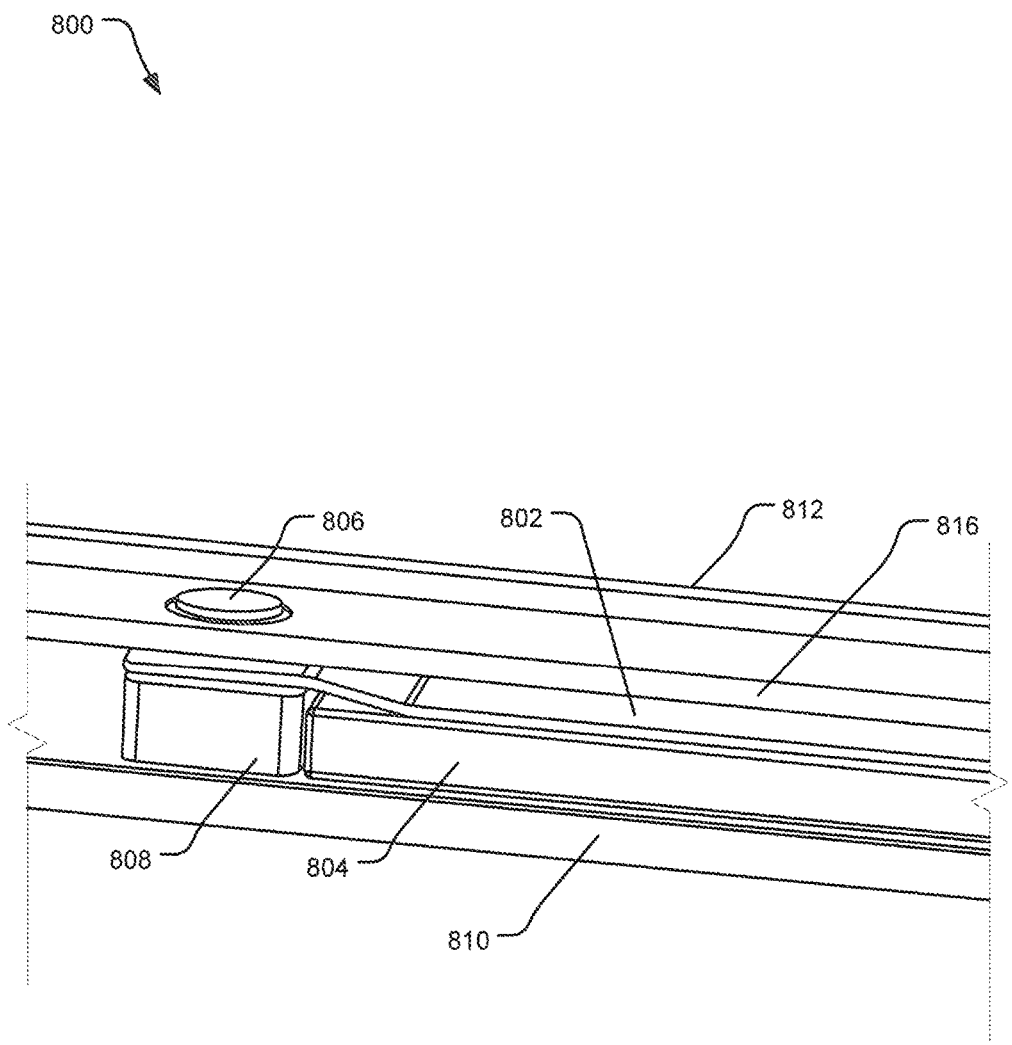

FIG. 8 illustrates an alternative view of a magnet biasing bracket assembly disclosed herein installed in a computing device.

Figure 9:
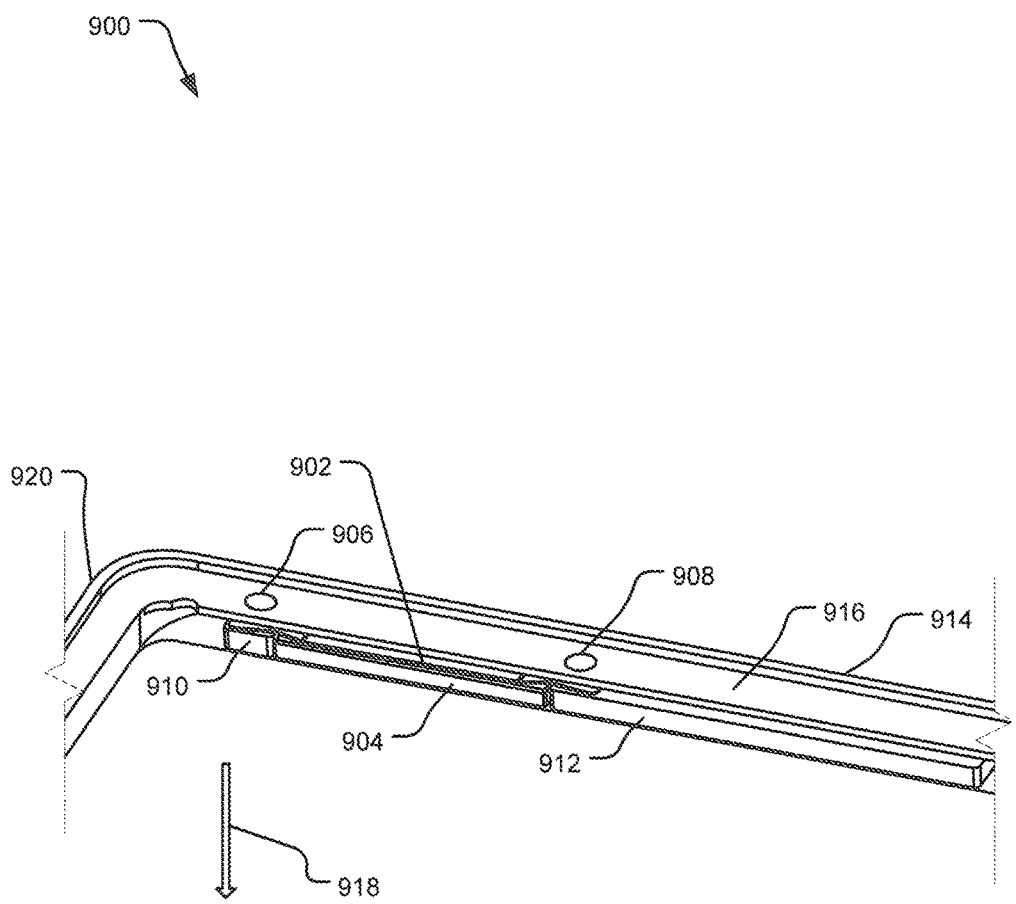

FIG. 9 illustrates yet another view of a magnet biasing bracket assembly disclosed herein installed in a computing device.

Figure 10:
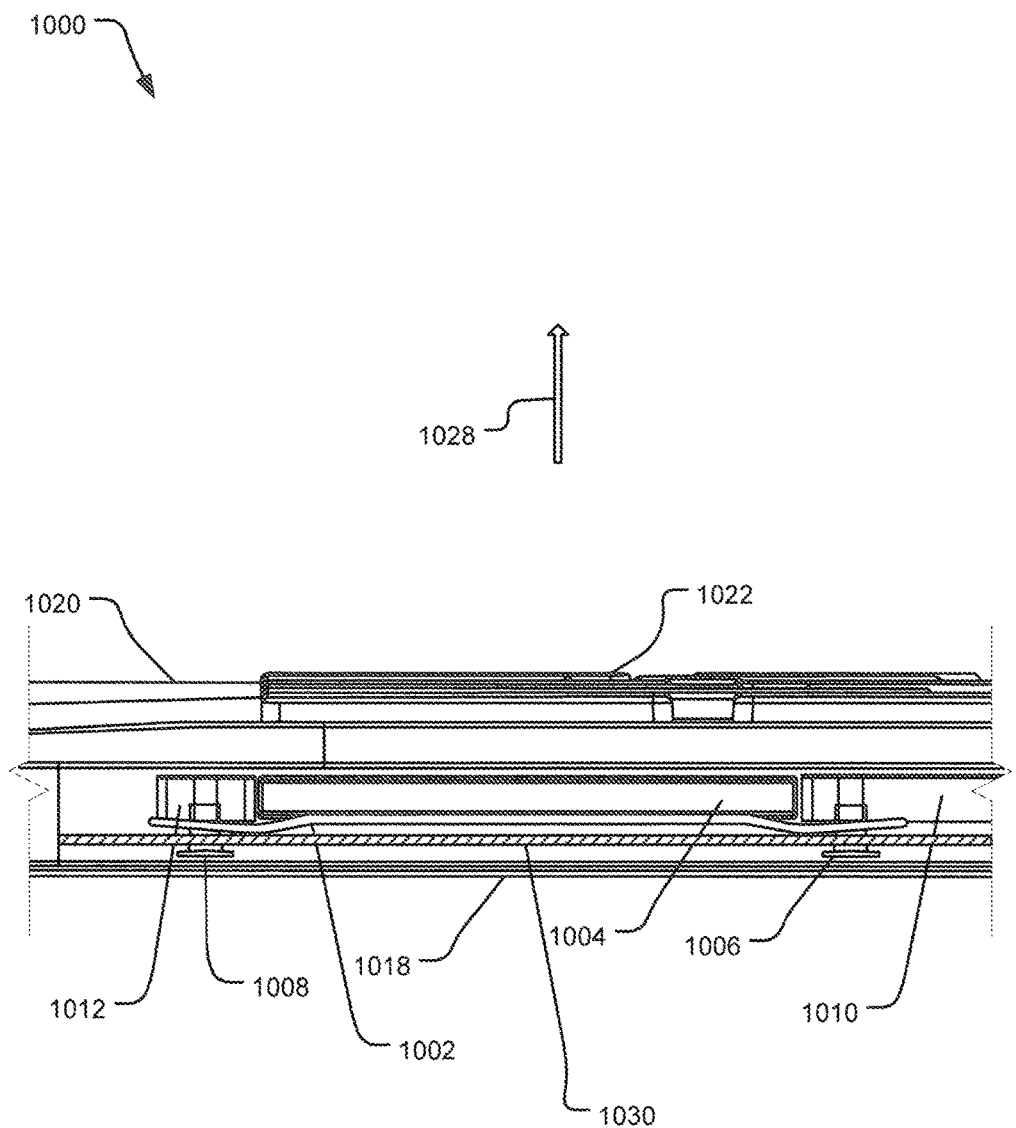

FIG. 10 illustrates an example front view of an example implementation of a magnet biasing bracket assembly disclosed herein.

Figure 11:
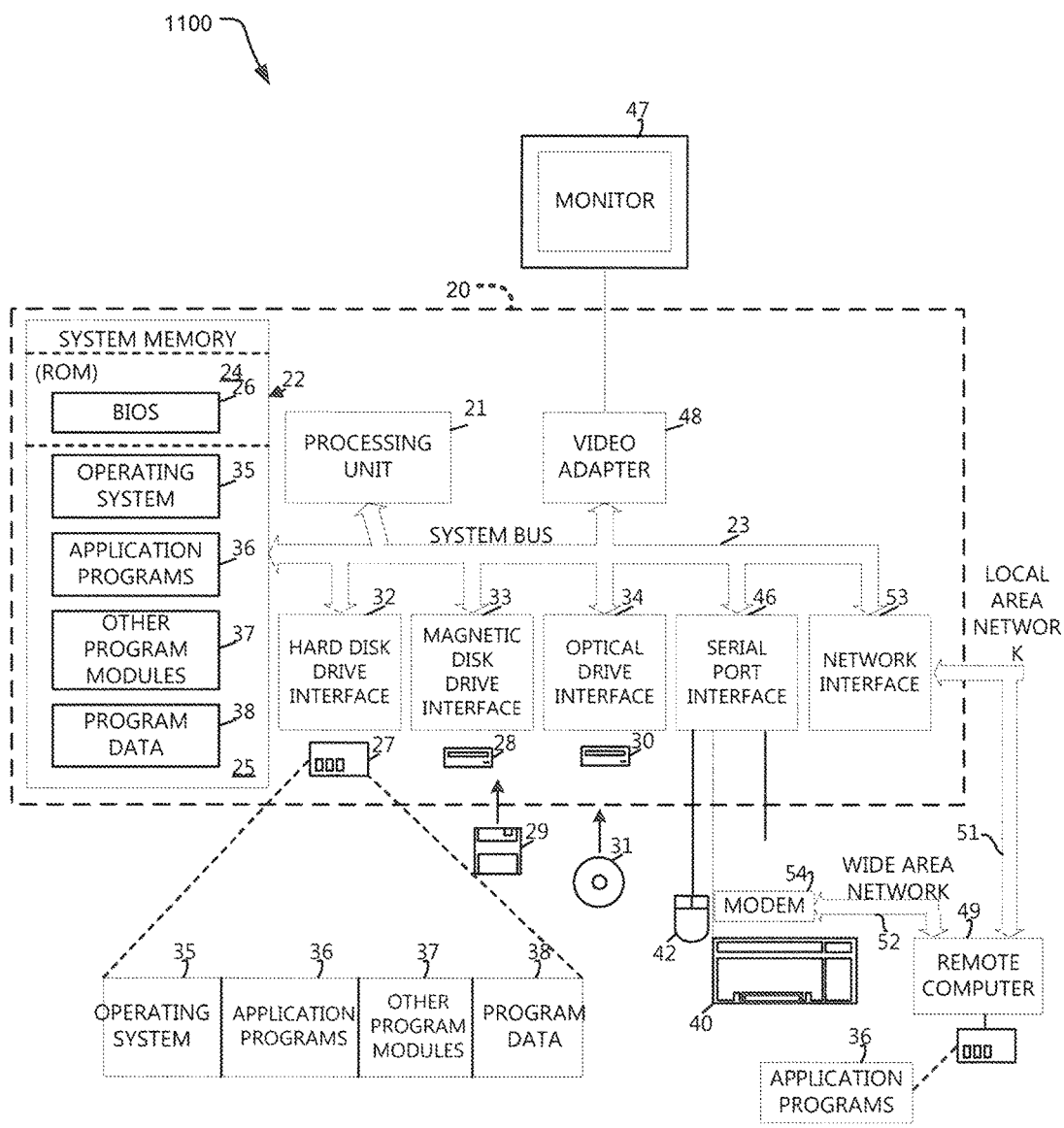

FIG. 11 illustrates an example computing system that may be use the threaded circuit board disclosed herein.

DETAILED DESCRIPTIONS

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form to facilitate describing the subject innovation.

Figure 1:
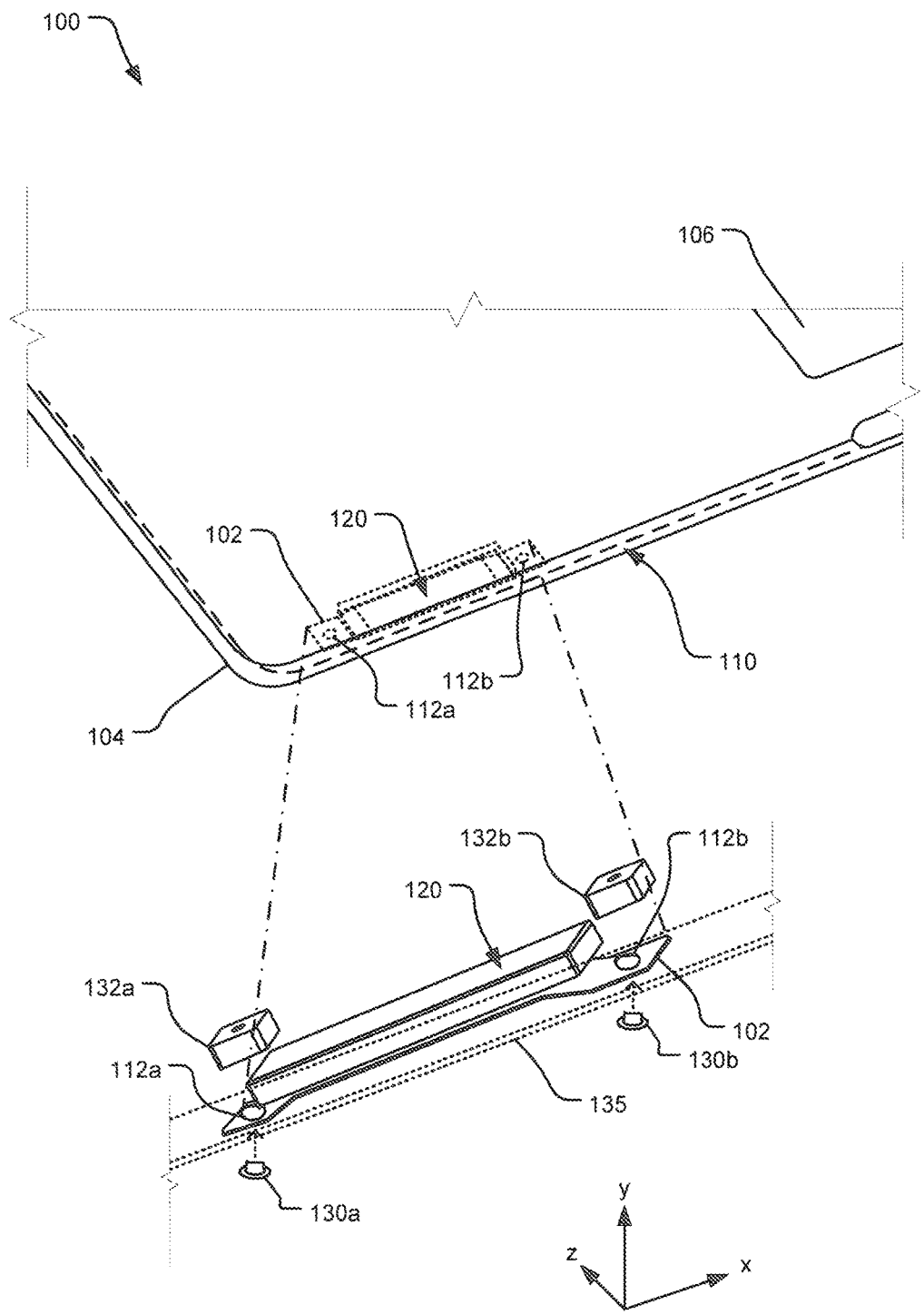
FIG. 1 illustrates an example implementation of a computing device with a magnet biasing mechanism disclosed herein.

FIG. 1 illustrates an implementation of a computing device 100 with a magnet biasing mechanism 102 disclosed herein. Specifically, FIG. 1 discloses a top view of an input component 104 that may include a keyboard (such as the keyboard 206 shown in FIG. 2), a track-pad 106 and various other input components. The magnet biasing mechanism 102 may be fastened to bottom chassis 110 of the input component 104 using fastening screws 130a and 130b (collectively referred to hereinafter and fastening screws 130). Specifically, the magnet biasing mechanism 102 is fastened to a chassis ledge 135 in the bottom chassis 110. The magnet biasing mechanism 102 is positioned between the chassis ledge 135 and nuts 132a and 132b (collectively referred to hereinafter and fastening screws 132). Note that while in this figure the nuts 132 are both shown to have a substantially square shape, in an alternative implementation one or more of the nuts 132 may have a different shape, such as a rectangular shape extending along the length of the chassis ledge 135.

In one implementation, the magnet biasing mechanism 102 is a spring bracket and it is placed adjacent to a magnet 120. In one implementation, the magnet 120 is attached to the magnet biasing mechanism 102 using an adhesive such as glue. Alternatively, the magnet 120 is attached to the magnet biasing mechanism 102 using other adhesive mechanism such as epoxy glue or a hook and loop fastener. Furthermore, in an implementation where the magnet biasing mechanism 102 is made of a metal, it may be magnetically attached to the magnet 120. Alternatively, the magnet 120 is attached to the magnet biasing mechanism 102 by friction. The magnet biasing mechanism 102 may be positioned below the magnet 120 such that when the fastening screws 130 are attached to the magnet biasing mechanism 102, the magnet 120 is pressed towards the top of the internal surface of the input component 104. In other words, the tightening of the fastening screws 130 to the magnet biasing mechanism 102 biases the magnet 120 away from chassis ledge 135 and attaches the magnet 120 to the top of the internal surface of the input component 104. Thus, providing the magnet biasing mechanism 102 allows the magnet 120 to be releasably attached to the top of the internal surface of the input component 104. The magnet 120 forms a magnetic field that causes a top component such as the top component 220 shown in FIG. 2 or a laptop cover including an output screen to magnetically close when it is brought close to the top surface of the input component 104.

The fastening screws 130 may be inserted through holes in the chassis ledge below fastening holes 112a and 112b (collectively referred to hereinafter and fastening holes 112)

in the magnet biasing mechanism 102, and through the nuts 132 located above the magnet biasing mechanism 102. Thus, in the illustrated implementation, the magnet biasing mechanism 102 is positioned between the chassis ledge 135 and the nuts 132 along the y-axis and the magnet 120 is located between the nuts 132 along the x-axis, with the y-axis designating the thickness of the input component 104 and the x-axis designating the length of the input component 104.

In one implementation, the thickness of the magnet biasing mechanism 102 is approximately 0.3 mm. Furthermore, the magnet biasing mechanism 102 may be formed to have a center stripe and two side flanges, one on each end of the center stripe along its length. Each of the two flanges may include two surfaces forming a flat V-shape. Specifically, each of the two flanges are v-shaped with an apex of the V-shape being away from the magnet 120. This shape of the flanges causes the magnet biasing mechanism 102 to put pressure on the magnet when the magnet biasing mechanism 102 is fastened to a chassis so that the magnet 120 is removably or non-permanently attached to an inner surface of an input component 104. As the screws 130 are tightened in the y-axis direction through the chassis ledge 135, the magnet biasing mechanism 102, and the nuts 132, the magnet biasing mechanism 102 acts as a spring and biases the magnet 120 towards the inner surface of the input component 104.

One end of one of the two surfaces of each of the flanges is attached to the center strip. Note that while various sections of the magnet biasing mechanism 102 are described with different names, the magnet biasing mechanism 102 may be made as a single piece of material. Each of the fastening holes 112 may be formed on a surface of a flange that is away from the center strip. The magnet biasing mechanism 102 may be made of a metal, plastic, or other material having high elasticity. For example, the magnet biasing mechanism 102 may be made of steel, aluminum, magnesium, and other metals, where the metal may be selected based on a desired elasticity. Moreover, plastics with high yield strength may also be used for the magnet biasing mechanism 102. Other materials may also be used as long as such material does not permanently deform when the magnet biasing mechanism 102 is clamped by the nuts 132a and 132b. yet alternatively, the biasing mechanism 102 may be made from a material such as silicone elastomer or rubber.

Having the magnet biasing mechanism 102 made of a material having high elasticity results in the center strip causing pressure on the magnet 120 towards the top of the internal surface of the input component 104. Furthermore, the combination of the magnet biasing mechanism 102 and the magnet 120 allows flexible assembly of the computing device 100 as the magnet 120 does not have to be glued to the top of the internal surface of the input component 104. Furthermore, the combination of the magnet biasing mechanism 102 and the magnet 120 also allows for blind assembly where the magnet biasing mechanism 102 and the magnet 120 are assembled under the chassis ledge 135. Additionally, as the magnet biasing mechanism 102 attaches the magnet 120 to the input component 104 removably or non-permanently, it is easy to troubleshoot any defect in the assembly of the input component 104.

In one implementation, the biasing mechanism 102 may include a biasing bracket with the nuts 132 directly adhered to the biasing bracket or press-fit into the biasing bracket. Furthermore, in an alternative implementation, the magnet 120 is retained by friction between the biasing mechanism 102 and an inner surface of the input component 104.

Figure 2:
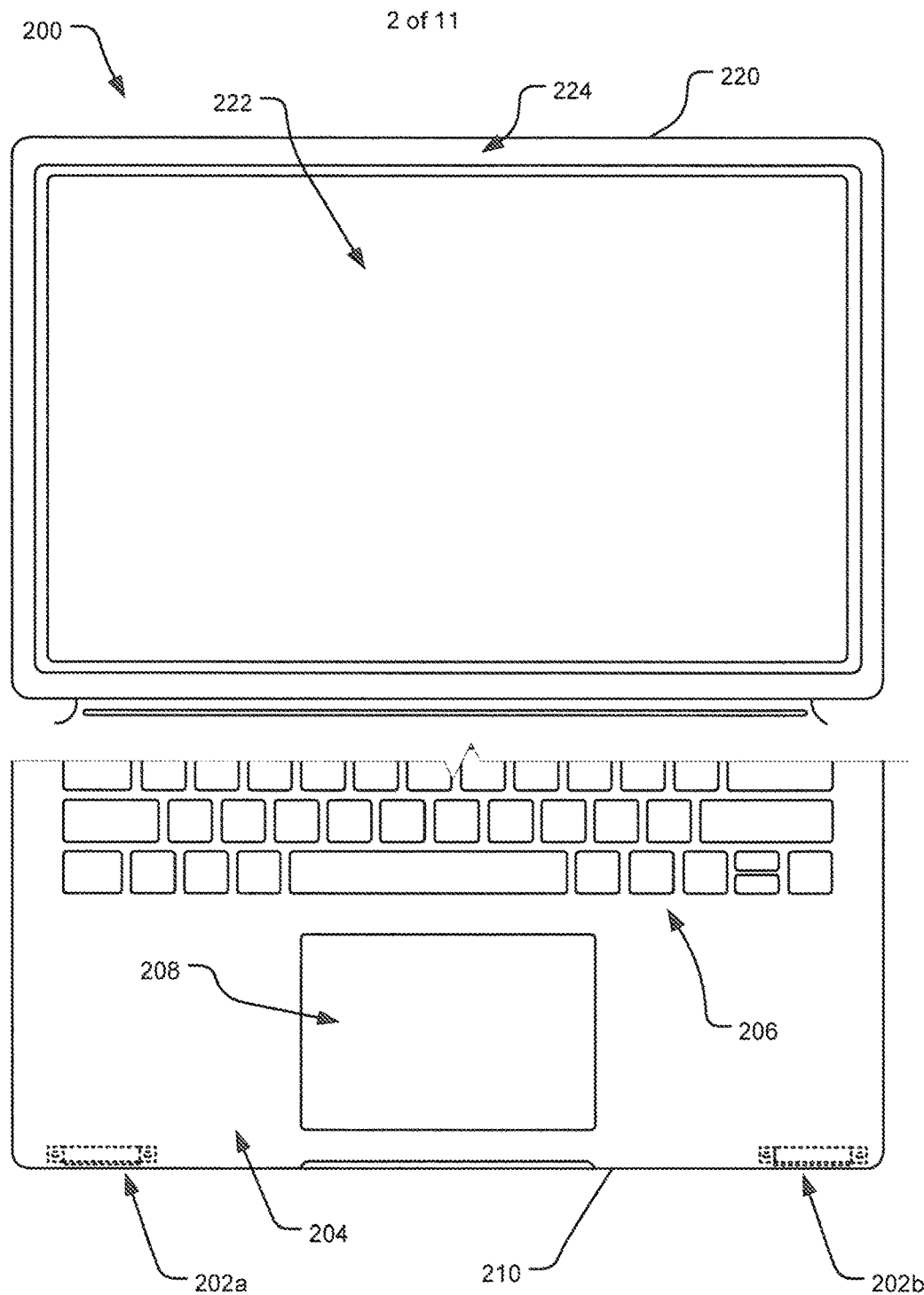
FIG. 2 illustrates an alternative view of an example implementation of a computing device with a magnet biasing mechanism disclosed herein.

FIG. 2 illustrates an alternative view of an example implementation of a computing device 200 with two magnet biasing bracket assemblies 202a and 202b (referred to hereinafter as magnet biasing bracket assemblies 202) disclosed herein. Specifically, FIG. 2 illustrates a top view of an input component 204 of the computing device 200. The input component 204 is illustrated to have a keyboard 206 and a mouse pad 208. As illustrated, each of the two magnet biasing bracket assemblies 202 are positioned along a front surface 210 of the input component 204 and below the top surface of the input component 204. Specifically, the each of the two magnet biasing bracket assemblies 202 includes a magnet (such as the magnet 120 disclosed in FIG. 1) and a magnet biasing mechanism (such as the magnet biasing mechanism 102 disclosed in FIG. 1).

The computing device 200 also includes a top component 220 that is foldably attached to the input component 204. The top component 220 may include an output screen 222 within a frame 224. In one implementation, the frame 224 may be made of a material that is magnetically attracted to the magnets of the magnet biasing bracket assemblies 202. Thus, when a user folds the top component 220 towards the input component 204, the top component 220 securely closes along a top surface of the input component 204 due to the magnetic attraction between the magnets of the magnet biasing bracket assemblies 202 and the frame 220.

Figure 3:
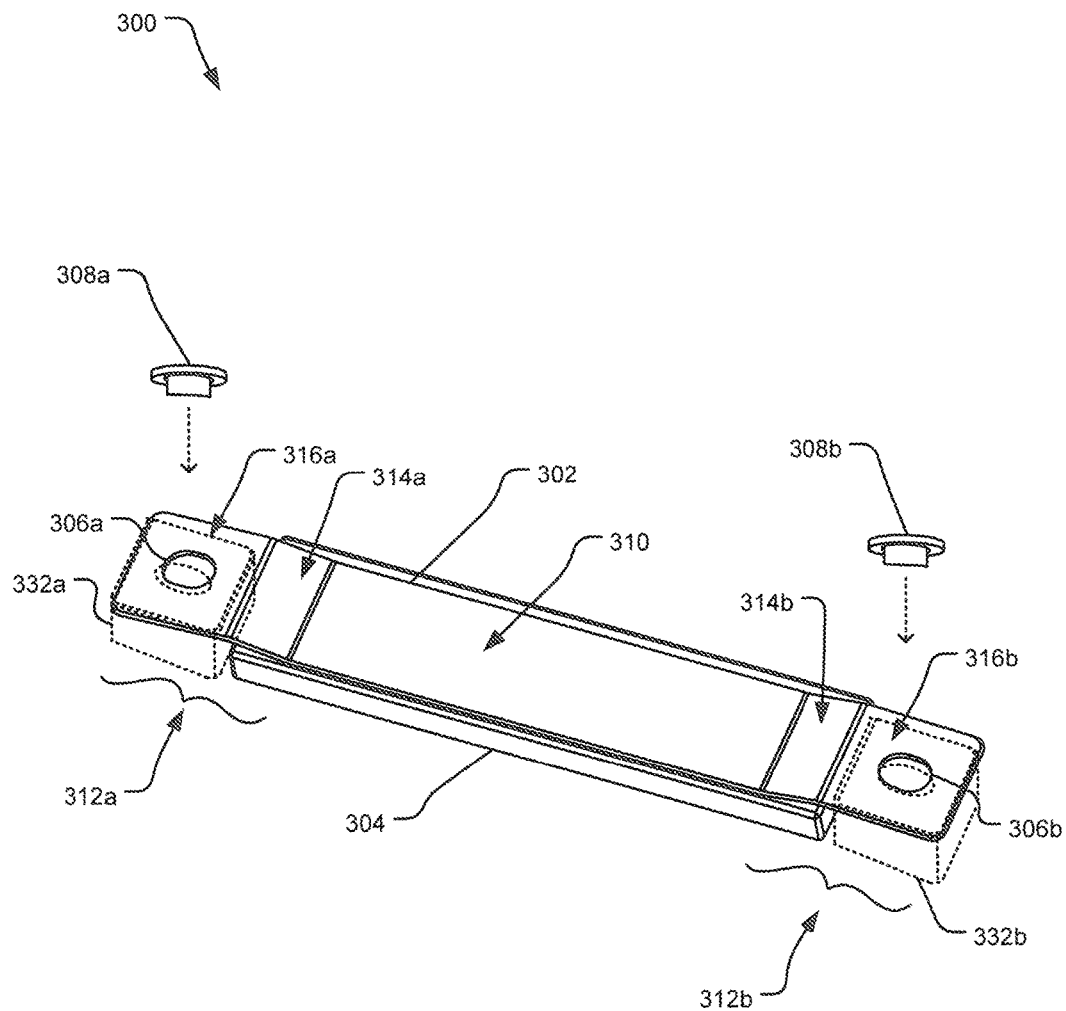
FIG. 3 illustrates an example implementation of a magnet biasing mechanism disclosed herein.

FIG. 3 illustrates an example implementation of a magnet biasing bracket assembly 300 disclosed herein. The magnet biasing bracket assembly 300 includes a biasing mechanism 302 and a magnet 304. In one implementation, the magnet 304 may be attached to the biasing mechanism 302 using an adhesive mechanism such as epoxy glue or a hook and loop fastener. Alternatively, the magnet 304 is attached to the magnet biasing mechanism 302 by friction. Specifically, FIG. 3 illustrates a view from a bottom of a computing device such that the magnet 304 is adjacent to the top internal surface of an input component of such a computing device.

The biasing mechanism 302 includes a center stripe 310 and two side flanges 312a and 312b (referred to hereinafter as side flanges 312). Each of the side flanges 312 is made of a substantially flat V shape with internal stripes 314a and 314b attached to the center stripe 310 and external stripes 316a and 316b attached to the internal stripes 314a and 314b. Each of the external stripes 316a and 316b includes a fastening hole, respectively fastening holes 306a and 306b. Screws 308a and 308b (collectively referred to hereinafter and fastening screws 308) may be fastened through the fastening holes 306a and 306b to secure the biasing mechanism 302 to fastening nuts 332a and 332b (collectively referred to hereinafter and fastening nuts 332) located on the other side of the biasing mechanism 302. The tightening of the screws 306 though the fastening nuts 332 results in the magnet 304 being affixed to an internal top surface of an input component of a computing device.

Furthermore, the magnet 304 is positioned between the two fastening nuts 332. A chassis ledge (such as the chassis ledge 135 shown in FIG. 1) may be positioned between the fastening screws 308 and the biasing mechanism 302. As the fastening screws 308 are tightened, the biasing mechanism 302 acts as a spring and biases the magnet 304 towards an internal surface of the input component of a computing device.

Figure 4:
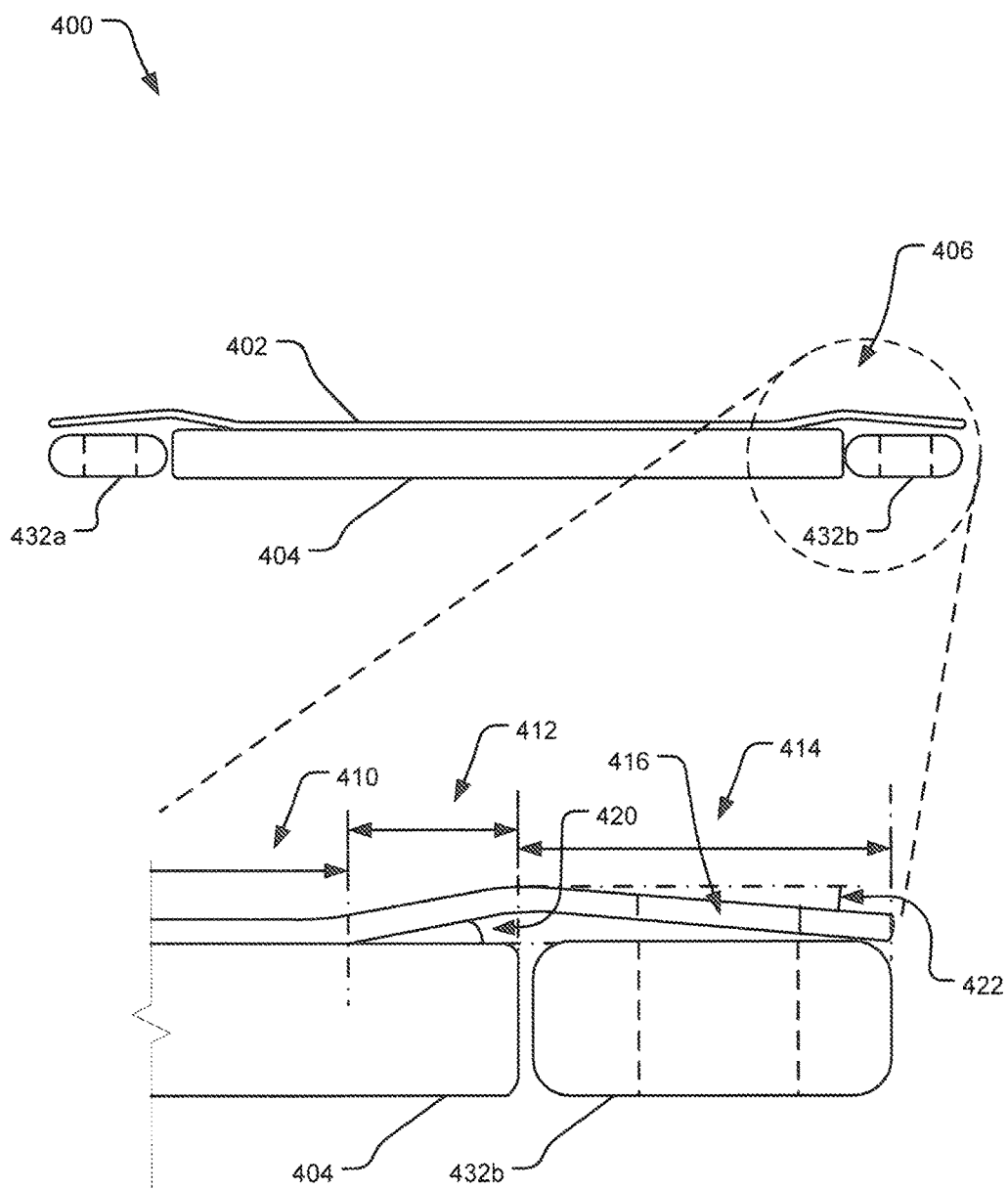
FIG. 4 illustrates an alternative view of an example implementation of a magnet biasing mechanism disclosed herein.

FIG. 4 illustrates an alternative view of an example implementation of a magnet biasing bracket assembly 400 disclosed herein. The magnet biasing bracket assembly 400 includes a biasing mechanism 402 and a magnet 404. In one implementation, the magnet 404 may be attached to the biasing mechanism 402 using an adhesive mechanism such as epoxy glue or a hook and loop fastener. Alternatively, the magnet 404 is attached to the magnet biasing mechanism 402 by friction. The magnet 404 is positioned between two fastening nuts 432a and 432b (collectively referred to herein as fastening nuts 432). The biasing bracket includes a center stripe 410 and two side flanges. In the illustrated implementation, one such side flange 406 is disclosed in further detail. As disclosed herein, the side flange 406 includes an internal stripe 412 and an external stripe 414. The external stripe 414 may include a fastening hole 416 that may receive a screw that is tightened through the fastening nut 432b. In one implementation, angle 420 between the center stripe 410 and the internal stripe 412 may be approximately 5-15 degrees. On the other hand, angle 422 between the external stripe 416 and the center stripe 410 may be approximately 5 degrees.

As shown in FIG. 4, the flange 406 has a substantially flat V-shape formed by the angle between the internal stripe 412 and an external stripe 414, with an apex of the V-shape being away from the magnet 404. This shape of the flange 406 causes the magnet biasing mechanism 402 to put pressure on the magnet 404 when the magnet biasing mechanism 402 is fastened to a chassis so that the magnet 404 is removably or non-permanently attached to an inner surface of an input component, such as a body of a computing device that includes a key-board.

Due to the configuration of the biasing bracket 404, when a screw is fastened through the fastening hole 416 (from top, as illustrated in FIG. 4), first the internal stripe 412 rotates towards the magnet (thus decreasing the angle 420) to put pressure on the magnet 404 and securely attach it to an internal top surface of a computing device. As the screw is further fastened through the fastening hole 416, the external stripe rotates away from the magnet (thus decreasing the angle 422). Due to the elasticity of the biasing mechanism 402, the rotations of the internal stripe 412 and the external stripe 414 securely attaches the magnet 404 to an internal surface of an input component of a computing device.

Figure 5:
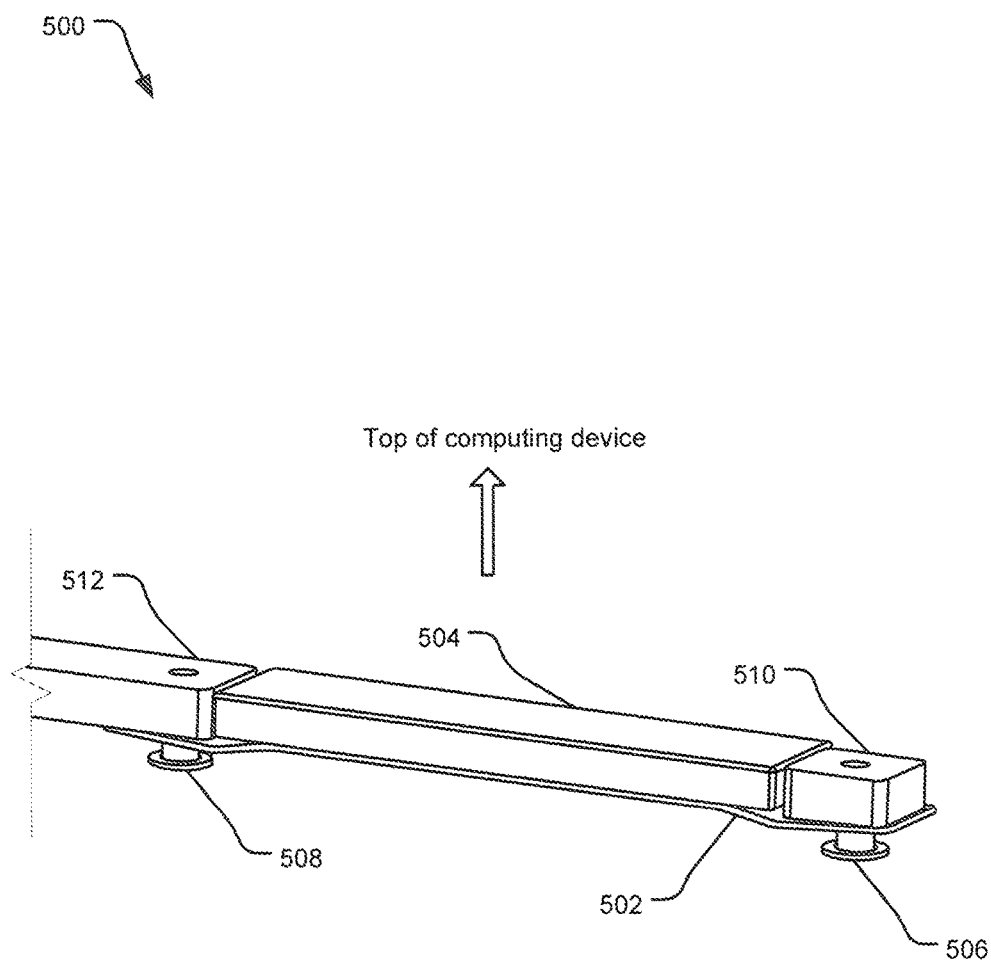
FIG. 5 illustrates an example implementation of a magnet biasing bracket assembly disclosed herein.

FIG. 5 illustrates an example implementation of a magnet biasing bracket assembly 500 disclosed herein. The magnet biasing bracket assembly 500 includes a biasing mechanism 502 and a magnet 504. In one implementation, the magnet 504 may be attached to the biasing mechanism 502 using an adhesive mechanism such as epoxy glue or a hook and loop fastener. Alternatively, the magnet 504 is attached to the magnet biasing mechanism 502 by friction. The magnet 504 is positioned along a length of a front edge of an input component of a computing device between a substantially square nut 510 and a substantially rectangular nut 512. In one implementation, fastening screws 506 and 508 may be used to attach the biasing mechanism 502 to the nuts 510 and 512, respectively. The combination of the magnet 504 and the nuts 510 and 512 may be positioned along an inner bottom and inner front surface of an input component of a computing device. In an alternative implementation, the nuts 510 and 512 may also be directly adhered to the biasing mechanism 502 or press-fit into the biasing mechanism 502. In other words, the nuts 502 and 512 may be forced under pressure into the biasing mechanism 502.

Figure 6:
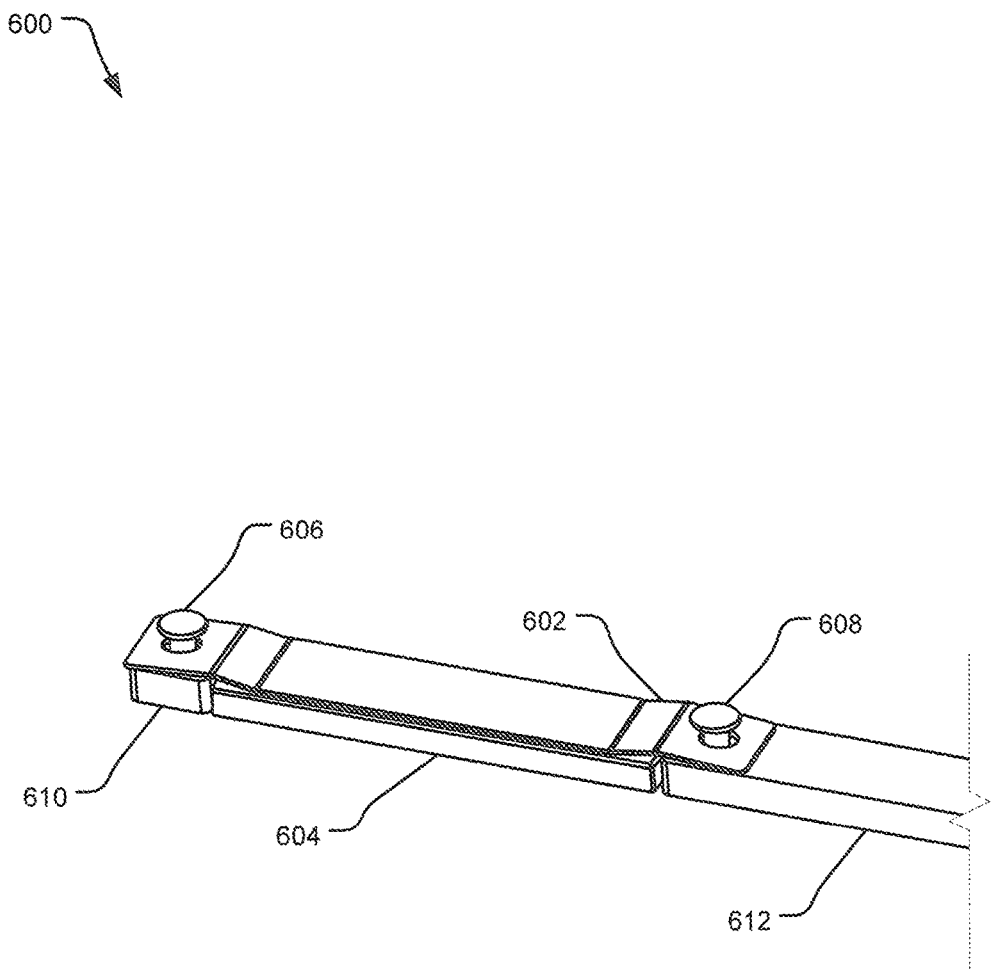
FIG. 6 illustrates an alternative view of an example implementation of a magnet biasing bracket assembly disclosed herein.

FIG. 6 illustrates yet another view of an example implementation of a magnet biasing bracket assembly 600 disclosed herein. The magnet biasing bracket assembly 600 includes a biasing mechanism 602 and a magnet 604. In one implementation, the magnet 604 may be attached to the biasing mechanism 602 using an adhesive mechanism such as epoxy glue or a hook and loop fastener. Alternatively, the magnet 604 is attached to the biasing mechanism 602 by friction. The magnet 604 is positioned along a length of a front edge of an input component of a computing device between a substantially square nut 610 and a substantially rectangular nut 612. In one implementation, fastening screws 606 and 608 may be used to attach the biasing mechanism 602 to the nuts 610 and 612, respectively. The combination of the magnet 604 and the nuts 610 and 612 may be positioned along an inner bottom and inner front surface of an input component of a computing device.

FIG. 7 an example implementation of a magnet biasing bracket assembly 700 disclosed herein installed in a computing device. The magnet biasing bracket assembly 700 includes a biasing mechanism 702 and a magnet 704. In one implementation, the magnet 704 may be attached to the biasing mechanism 702 using an adhesive mechanism such as epoxy glue or a hook and loop fastener. Alternatively, the magnet 704 is attached to the biasing mechanism 702 by friction. In one implementation, the magnet 704 is positioned along inside of a top surface 714 of an input component of a computing device. The magnet 704 is further positioned along a length of a front edge 716 of the input component of the computing device between a substantially square nut 710 and a substantially rectangular nut 712. In one implementation, fastening screws 706 and 708 may be used to attach the biasing mechanism 702 to the nuts 710 and 712, respectively. As the screws 706 and 708 attaches the biasing mechanism 702 to the nuts 710 and 712, a center section of the biasing mechanism 702 exerts pressure on the magnet 704 to bias the magnet 704 towards the top internal surface 714. As a result, the magnet 704 is securely, but removably or non-permanently, positioned adjacent the top internal surface 714.

FIG. 8 illustrates another view of an example implementation of a magnet biasing bracket assembly 800 disclosed herein. Specifically, the magnet biasing bracket assembly 800 discloses a biasing mechanism 802 securely attaching a magnet 804 to an internal top surface 810 of an input component of a computing device. In one implementation, the magnet 804 may be attached to the biasing mechanism 802 using an adhesive mechanism such as epoxy glue or a hook and loop fastener. Alternatively, the magnet 804 is attached to the biasing mechanism 802 by friction. In the illustrated implementation, the magnet 804 is positioned along an internal front surface 812 of the input component adjacent a nut 808, where the nut 806 is placed between a side flange of the biasing bracket and the internal top surface 810. A fastening screw 806 may be used to fasten the biasing mechanism 802 to the nut 808. Furthermore, in the illustrated implementation, the biasing mechanism 802 is placed on top of a chassis 816 of the input component.

FIG. 9 illustrates yet another view of an example implementation of a magnet biasing bracket assembly 900 disclosed herein. Various components of FIG. 9 are illustrated to be as visible as if the input component is turned upside down. Specifically, FIG. 9 illustrates the magnet biasing bracket assembly 900 configured within an input component of a computing device. The magnet biasing bracket assembly 900 includes a biasing mechanism 902 and a magnet 904 positioned within a chassis 916. In one implementation, the magnet 904 may be attached to the biasing mechanism 902 using an adhesive mechanism such as epoxy glue or a hook and loop fastener. Alternatively, the magnet 904 is attached to the biasing mechanism 902 by friction. Specifically, the chassis 916 may be formed around a lower periphery of the input component of the computing device. In one implementation, the magnet 904 is placed in the chassis 916 such that the magnet 904 is substantially adjacent to the top surface (as illustrated by the arrow 918) of the input component.

The biasing mechanism 902 is positioned adjacent to the magnet 904 and away from the top surface of the input component. The magnet 904 is also positioned substantially parallel to a front edge 914 of the input component. FIG. 9 also illustrates a side edge 920 of the input component. Along the front edge 914 of the input component, the magnet 904 is placed in between two nuts 910 and 912. In one implementation, the nut 910 is of a substantially square shape and it is placed between the magnet 904 and the side edge 920. On the other hand, the nut 912 may have a substantially rectangular shape. The nut 912 may also function as a counterweight to the weight of a top component (such as the top component 220 disclosed in FIG. 2) so that when the computing device is open, it does not tilt over due to the weight of the top component.

The biasing mechanism 902 may have two side flanges at each of the two ends of the biasing mechanism 902 along its length. Each of the side flanges (not visible in FIG. 9) may include a fastening hole that may be aligned to fastening holes 906 and 908 in the chassis 916. Fastening screws (such as the fastening screws 606 and 608 of FIG. 6) may be inserted through the fastening holes 906 and 908 of the chassis 916 and further through the fastening holes of the biasing mechanism 902 and through the nuts 910 and 912 to secure the biasing mechanism 902 to the chassis 916. Furthermore, such fastening of the biasing mechanism 902 also causes the magnet 904 to be securely but removably or non-permanently attached inside the chassis 916.

FIG. 10 illustrates yet alternative view of an example implementation of a magnet biasing bracket assembly 1000 disclosed herein. The magnet biasing bracket assembly 1000 is illustrated as configured within an input component 1020 of a computing device. For example, the input component 1020 may be the body of a laptop that includes a mouse pad, a keyboard 1022 and various other components of the laptop. Specifically, FIG. 10 illustrates a side view of the magnet biasing bracket assembly 1000 as seen from the front of the computing device, with the top of the computing device being as illustrated by an arrow 1028 with the bottom of the input component being 1018.

The magnet biasing bracket assembly 1000 includes a magnet 1004 positioned above a magnet biasing mechanism 1002. In one implementation, the magnet 1004 may be attached to the biasing mechanism 1002 using an adhesive mechanism such as epoxy glue or a hook and loop fastener. Alternatively, the magnet 1004 is attached to the biasing mechanism 1002 by friction. The magnet 1004 is positioned between nuts 1010 and 1012. In one implementation, the nut 1012 is a substantially square nut and it configured near a side edge of the input component. The nut 1010 may be a substantially rectangular nut that may be positioned near the center along a length of a front edge of the input component. The biasing mechanism 1002 is positioned between a chassis ledge 1030 and the nuts 1010 and 1012. The chassis ledge 1030 has opening holes aligned with the opening holes in the biasing mechanism 1002 and the opening holes in the nuts 1010 and 1012. Fastening screws 1006 and 1008 may be used to secure the biasing mechanism 1002 with the chassis ledge 1030 and the nuts 1010 and 1012 respectively. As the fastening screws 1006 and 1008 are tightened to affix the biasing mechanism 1002 to the chassis ledge 1030, the biasing mechanism 1002 biases the magnet 1004 towards the top inner surface of the input component.

FIG. 11 illustrates an example system 1100 that may be implemented on a threaded circuit board disclosed herein. The example hardware and operating environment of FIG. 11 implemented using the described technology includes a computing device, such as a general-purpose computing device in the form of a computer 20, a mobile telephone, a personal data assistant (PDA), a tablet, smart watch, gaming remote, or other type of computing device. In the implementation of FIG. 11, for example, the computer 20 includes a processing unit 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units 21, commonly referred to as a parallel processing environment. The computer 20 may be a conventional computer, a distributed computer, or any other type of computer; the implementations are not so limited. An implementation of the computer 20 may be implemented on a circuit board as disclosed herein.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 29, optical disk 31, ROM 24, or RAM 25, including an operating system 35, one or more application programs 36, other program modules 37, and program data 38. For example, one or more modules of the example system 600 may be implemented on the threaded circuit board disclosed herein. A user may generate reminders on the personal computer 20 through input devices such as a keyboard 40 and pointing device 42. Other input devices may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor 47, computers typically include other peripheral output devices, such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An input component of a computing device is disclosed herein as including a magnet located along an internal chassis of the input component, a biasing mechanism located between the magnet and a ledge of the internal chassis, and a fastening mechanism configured to attach the biasing bracket to the ledge of the internal chassis such that the magnet is non-permanently attached to the internal chassis. In one implementation, the magnet is glued to the biasing mechanism. Alternatively, the magnet is attached to the biasing mechanism using at least one of epoxy glue, magnetic bond, hook and loop fastener and friction. In an alternative implementation, the fastening mechanism includes one or more combinations of nut and screw, wherein the screw passes through a receiving hole in the biasing bracket.

In one implementation, the magnet is retained between the internal chassis of the input component and the biasing mechanism by friction. In another implementation, the biasing mechanism is a spring bracket made of a metal stripe comprising a center section along a surface of the magnet, and two side flanges, each of the two side flanges including fastening holes to attach the biasing bracket to the chassis. In one implementation, each of the two side flanges includes an internal stripe at a first angle compared to the center section and an external flange at a second angle compared to the center section, wherein the first angle is between five and fifteen degrees and the second angle is approximately five degrees.

In another implementation, the fastening mechanism includes a first and a second fastening nuts and the magnet is located between the first and the second fastening nuts along the front edge of the input component. Alternatively, at least one of the fastening nuts are adhesively attached to the biasing mechanism and press-fit into the biasing mechanism. Yet alternatively, the biasing mechanism is made of at least one of silicone elastomer and rubber.

An apparatus disclosed herein includes a magnet located along an inner surface of an input component of a computing device, a biasing mechanism located adjacent to the magnet, and a fastening mechanism configured to attach the biasing bracket to a chassis of the input component, wherein the biasing bracket is configured to removably attach the magnet to the inner surface of the input component. In one implementation of the apparatus, the biasing mechanism is made of a stripe of elastic material comprising a center section along a surface of the magnet, and two side flanges, each of the two side flanges including fastening holes to attach the biasing bracket to the chassis using fastening screws.

In another implementation of the apparatus, each of the two side flanges are of substantially v-shaped with an apex of the V-shape being away from the magnet. Alternatively, the magnet is attached to the biasing mechanism using at least one of epoxy glue, magnetic bond, and hook and loop fastener. Yet alternatively, the fastening mechanism includes a first and a second fastening nuts positioned along a front edge of the input component and the magnet is located between the first and the second fastening nuts along the front edge of the input component. Alternatively, each of the first and the second nuts are located between the biasing mechanism and the inner surface of the input component.

A magnet biasing bracket assembly for a computing device includes a magnet located along an internal chassis of an input component of the computing device, a biasing mechanism located between the magnet and a ledge of the internal chassis, and a fastening mechanism configured to attach the biasing mechanism to the ledge of the internal chassis such that the magnet is removably attached to the internal chassis. In one implementation of the magnet biasing bracket assembly, the fastening mechanism includes one or more combinations of nut and screw, wherein the screw passes through a receiving hole in the biasing mechanism. In another implementation, the biasing bracket is made of a metal stripe comprising a center section along a surface of the magnet, and two side flanges, each of the two side flanges including fastening holes to attach the biasing mechanism to the chassis. Alternatively, the magnet is attached to the biasing mechanism using at least one of epoxy glue, magnetic bond, hook and loop fastener and friction.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. An input component of a computing device, comprising:
   a magnet located along an internal chassis of the input component;
   a biasing mechanism located between the magnet and a ledge of the internal chassis; and
   a fastening mechanism configured to attach the biasing mechanism to the ledge of the internal chassis such that the magnet is non-permanently attached to the internal chassis, wherein the biasing mechanism is a spring bracket made of a metal stripe comprising a center section along a surface of the magnet, and two side flanges, each of the two side flanges including fastening holes to attach the spring bracket to the chassis.

2. The input component of claim 1, wherein the magnet is glued to the biasing mechanism.

3. The input component of claim 1, wherein the magnet is attached to the biasing mechanism using at least one of epoxy glue, magnetic bond, hook and loop fastener and friction.

4. The input component of claim 1, wherein the fastening mechanism includes one or more combinations of nut and screw, wherein the screw passes through a receiving hole in the biasing mechanism.

5. The input component of claim 1, wherein the magnet is retained between the internal chassis of the input component and the biasing mechanism by friction.

6. The input component of claim 1, wherein each of the two side flanges includes an internal stripe at a first angle compared to the center section and an external flange at a second angle compared to the center section, wherein the first angle is between five and fifteen degrees and the second angle is approximately five degrees.

7. The input component of claim 1, wherein the fastening mechanism includes a first and a second fastening nuts and the magnet is located between the first and the second fastening nuts along the front edge of the input component.

8. The input component of claim 7, wherein at least one of the fastening nuts are adhesively attached to the biasing mechanism and press-fit into the biasing mechanism.

9. The input component of claim 1, wherein the biasing mechanism is made of at least one of silicone elastomer and rubber.

10. An apparatus, comprising:
    a magnet located along an inner surface of an input component of a computing device;
    a biasing mechanism located adjacent to the magnet, wherein the biasing mechanism is made of an elastic portion comprising a center section along a surface of the magnet and two side flanges; and
    a fastening mechanism configured to attach the biasing mechanism to a chassis of the input component, wherein the biasing mechanism is configured to removably attach the magnet to the inner surface of the input component, wherein each of the two side flanges are of substantially v-shaped with an apex of the V-shape being away from the magnet.

11. The apparatus of claim 10, wherein the magnet is attached to the biasing mechanism using at least one of epoxy glue, magnetic bond, and hook and loop fastener.

12. The apparatus of claim 10, wherein the fastening mechanism includes a first and a second fastening nuts positioned along a front edge of the input component and the magnet is located between the first and the second fastening nuts along the front edge of the input component.

13. The apparatus of claim 12, wherein each of the first and the second fastening nuts are located between the biasing mechanism and the inner surface of the input component.

14. A magnet biasing bracket assembly for a computing device, the magnet biasing bracket assembly comprising:
    a magnet located along an internal chassis of an input component of the computing device;
    a biasing mechanism located between the magnet and a ledge of the internal chassis; and
    a fastening mechanism configured to attach the biasing mechanism to the ledge of the internal chassis such that the magnet is removably attached to the internal chassis.

15. A magnet biasing bracket assembly for a computing device, the magnet biasing bracket assembly comprising:

a magnet located along an internal chassis of an input component of the computing device;

a biasing mechanism located between the magnet and a ledge of the internal chassis; and a fastening mechanism configured to attach the biasing mechanism to the ledge of the internal chassis such that the magnet is removably attached to the internal chassis, wherein the fastening mechanism includes one or more combinations of nut and screw, wherein the screw passes through a receiving hole in the biasing mechanism.

16. The magnet biasing bracket assembly of claim 15, wherein the biasing mechanism is made of a metal stripe comprising a center section along a surface of the magnet, and two side flanges, each of the two side flanges including fastening holes to attach the biasing mechanism to the chassis.

17. The magnet biasing bracket assembly of claim 15, wherein the magnet is attached to the biasing mechanism using at least one of epoxy glue, magnetic bond, hook and loop fastener and friction.

* * * * *